(12) United States Patent
Fontenot et al.

(10) Patent No.: US 8,656,405 B2
(45) Date of Patent: Feb. 18, 2014

(54) PULLING HEAVY TASKS AND PUSHING LIGHT TASKS ACROSS MULTIPLE PROCESSOR UNITS OF DIFFERING CAPACITY

(75) Inventors: Nathan D. Fontenot, Cedar Park, TX (US); Jacob L. Moilanen, Austin, TX (US); Joel H. Schopp, Austin, TX (US); Michael T. Strosaker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1742 days.

(21) Appl. No.: 11/767,570

(22) Filed: Jun. 25, 2007

(65) Prior Publication Data

US 2008/0320487 A1 Dec. 25, 2008

(51) Int. Cl.
*G06F 9/46* (2006.01)

(52) U.S. Cl.
USPC ...................................................... 718/105

(58) Field of Classification Search
None
See application file for complete search history.

(56) References Cited

U.S. PATENT DOCUMENTS

| | | | |
|---|---|---|---|
| 4,318,174 A | | 3/1982 | Suzuki et al. |
| 5,701,482 A | * | 12/1997 | Harrison et al. ............... 718/105 |
| 5,835,767 A | | 11/1998 | Leigh |
| 6,301,603 B1 | * | 10/2001 | Maher et al. ................... 718/105 |
| 6,985,952 B2 | | 1/2006 | Bohrer et al. |
| 7,694,107 B2 | * | 4/2010 | Lin et al. ........................ 712/28 |
| 2006/0150191 A1 | * | 7/2006 | Masuda et al. ................ 718/105 |

FOREIGN PATENT DOCUMENTS

JP 6348664 A 12/1994

OTHER PUBLICATIONS

Weiss, Aaron, "CPUs Unite! New Techniques Unleash the Power of Team Processing", ACM, Jun. 2000, pp. 26-31.
Rolia et al., "A Capacity Management Service for Resource Pools", ACM, Proceedings of the Fifth International Workshop on Software and Performance (WOSP'05), Spain, Jul. 12-14, 2005, pp. 229-237.
Brecht et al., "Evaluating Network Processing Efficiency with Processor Partitioning and Asynchronous I/O", ACM, Proceedings of the 2006 EuroSys Conference (EuroSys'06), Belgium, Apr. 18-21, 2006, pp. 265-278.
He et al., "Forming Resource-Sharing Coalitions: A Distributed Resource Allocation Mechanism for Self-Interested Agents in Computational Grids", 2005 ACM Symposium on Applied Computing (SAC'05), USA, Mar. 13-17, 2005, pp. 84-91.
Zhang et al., "A Simulation-based Study of Scheduling Mechanisms for a Dynamic Cluster Environment", Proceedings of the 14th ACM International Conference on Supercomputing (ICS 2000), USA, May 8-11, 2000, pp. 100-109.

* cited by examiner

*Primary Examiner* — Meng An
*Assistant Examiner* — Eric C Wai
(74) *Attorney, Agent, or Firm* — Stephen R. Tkacs; Stephen J. Walder, Jr.; Steven L. Bennett (57) ABSTRACT

A mechanism is provided for scheduling tasks across multiple processor units of differing capacity. In a multiple processor unit system with processor units of disparate speeds, it is advantageous to have the most processing-intensive tasks run on the processor units with the highest capacity. All tasks are initially scheduled on the lowest capacity processor units. Because processor units with higher capacity are more likely to have idle time, these higher capacity processor units may pull one or more tasks onto themselves from the same or lower capacity processor units. A processor unit will attempt to pull tasks that utilize a larger percentage of the timeslice. When a higher capacity processor unit is overloaded or near capacity, the higher capacity processor unit may push tasks to processor units with the same or lower capacity. A processor unit will attempt to push tasks that utilize a smaller percentage of the timeslice.

24 Claims, 5 Drawing Sheets

PULLING HEAVY TASKS AND PUSHING LIGHT TASKS ACROSS MULTIPLE PROCESSOR UNITS OF DIFFERING CAPACITY

BACKGROUND

1. Technical Field

The present application relates generally to an improved data processing system and method. More specifically, the present application is directed to scheduling tasks across multiple processor units of differing capacity.

2. Description of Related Art

A central processing unit (CPU) is the computing part of the computer. Also generally called a "processor," the CPU is made up of the instruction decoders, schedulers, execution units, and the like that perform the functions associated with executing computer program instructions. The CPU, clock, and main memory make up a typical computer. A complete computer system requires the addition of control units, input and output devices, storage devices, and an operating system.

A multiprocessing architecture comprises multiple processor units (PUs), residing in one cabinet, which may share the same memory and may have dedicated memory, referred to as a local store. As processing needs increase, one may add additional PUs to absorb the increased processing volume. Multiprocessing architectures range from two to as many as thousands, or even more, processors.

A heterogeneous multiprocessing architecture comprises multiple PUs that are not the same. In some environments, this may mean that the PUs are identical, but running different operating systems, for instance. However, as used herein, a heterogeneous multiprocessing architecture comprises multiple PUs that have different architectures and/or processing capacity. In a heterogeneous multiprocessing system, optimal scheduling of tasks, sometimes referred to as processes, on the PUs with varying capacity presents a difficult problem. Current operating system offerings do not have a solution for handling scheduling of tasks across multiple processor units of different capacity.

SUMMARY

The illustrative embodiments recognize the disadvantages of the prior art and provide a mechanism for scheduling tasks across multiple processor units of varying capacity. In a multiple processor unit system with processor units of disparate speeds, it is advantageous to have the most processing-intensive tasks run on the processor units with the highest capacity. In the illustrative embodiments, all tasks are initially scheduled on the lowest capacity processor units. Because processor units with higher capacity are more likely to have idle time, these higher capacity processor units may pull one or more tasks onto themselves from the same or lower capacity processor units. A processor unit will attempt to pull tasks that utilize a larger percentage of their timeslice. When a higher capacity processor unit is overloaded or near capacity, the higher capacity processor unit may push tasks to processor units with the same or lower capacity. A processor unit will attempt to push tasks that utilize a smaller percentage of their timeslice. This may be extended to more than two levels of hierarchy. As task processor usage varies, near system equilibrium may be reached as task processor need becomes matched to processor units with corresponding capacity.

In one illustrative embodiment, a method for scheduling tasks across multiple processor units of differing capacity comprises monitoring tasks running on a first processor unit for a predetermined period of time to record usage measurements, based on the usage measurements, determining whether the first processor unit has extra cycles, and if the first processor unit has extra cycles, pulling a task from a second processor unit.

In one exemplary embodiment, the second processor unit has a same capacity as the first processor unit. In another exemplary embodiment, the second processor unit has a lower capacity than the first processor unit. In yet another exemplary embodiment, the task uses a large percentage of capacity of the second processor unit based on usage measurements recorded at the second processor unit.

In one exemplary embodiment, the method further comprises based on the usage measurements, determining whether the first processor unit is overloaded, and if the first processor unit is overloaded, pushing a light task from the first processor unit to a third processor unit. In a further illustrative embodiment, the third processor unit has a same capacity as the first processor unit. In another exemplary embodiment, the third processor unit has a lower capacity than the first processor unit. In yet another exemplary embodiment, the light task uses a small percentage of capacity of the third processor unit based on usage measurements recorded at the third processor unit.

In another illustrative embodiment, a method for scheduling tasks across multiple processor units of differing capacity comprises monitoring tasks running on a first processor unit for a predetermined period of time to record usage measurements, based on the usage measurements, determining whether the first processor unit is overloaded, and if the first processor unit is overloaded, pushing a light task from the first processor unit to a second processor unit.

In one exemplary embodiment, the second processor unit has a same capacity as the first processor unit. In another exemplary embodiment, the second processor unit has a lower capacity than the first processor unit. In yet another exemplary embodiment, the light task uses a small percentage of capacity of the third processor unit based on usage measurements recorded at the third processor unit.

In a further illustrative embodiment, a computer program product comprises a computer useable medium having a computer readable program. The computer readable program, when executed on a computing device, causes the computing device to monitor tasks running on a first processor unit for a predetermined period of time to record usage measurements, determine whether the first processor unit has extra cycles based on the usage measurements, and if the first processor unit has extra cycles, pull a task from a second processor unit.

In one exemplary embodiment, the second processor unit has a same capacity as the first processor unit. In another exemplary embodiment, the second processor unit has a lower capacity than the first processor unit. In yet another exemplary embodiment, the task uses a large percentage of capacity of the second processor unit based on usage measurements recorded at the second processor unit.

In still another exemplary embodiment, the computer readable program, when executed on the computing device, further causes the computing device to determine whether the first processor unit is overloaded based on the usage measurements, and if the first processor unit is overloaded, push a light task from the first processor unit to a third processor unit. In a further exemplary embodiment, the third processor unit has a same capacity as the first processor unit. In another exemplary embodiment, the third processor unit has a lower capacity than the first processor unit. In yet another exemplary embodiment, the light task uses a small percentage of capacity of the third processor unit based on usage measurements recorded at the third processor unit.

In another illustrative embodiment, a data processing system comprises a plurality of processor units. The plurality of processor units comprises a first group of processor units having a first capacity and a second group of processor units having a second capacity. The data processing system further comprises a memory coupled to a first processor unit within the plurality of processor units. The memory contains instructions which, when executed by the first processor unit, cause the first processor unit to monitor tasks running on the first processor unit for a predetermined period of time to record usage measurements, determine whether the first processor unit has extra cycles based on the usage measurements, and if the first processor unit has extra cycles, pull a task from a second processor unit.

In one exemplary embodiment, the first processor unit and the second processor unit are within the first group of processor units. In another exemplary embodiment, the first processor unit is within the first group. The second processor unit is within the second group. The second capacity is lower than the first capacity. In yet another exemplary embodiment, the task uses a large percentage of capacity of the second processor unit based on usage measurements recorded at the second processor unit.

In one exemplary embodiment, the instructions, when executed by the first processor unit, further cause the first processor unit to determine whether the first processor unit is overloaded, and if the first processor unit is overloaded based on the usage measurements, push a light task from the first processor unit to a third processor unit. In a further exemplary embodiment, the first processor unit and the third processor unit are within the first group of processor units. In another exemplary embodiment, the first processor unit is within the first group, the third processor unit is within the second group, and the first capacity is higher than the second capacity. In still another exemplary embodiment, the light task uses a small percentage of capacity of the third processor unit based on usage measurements recorded at the third processor unit.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
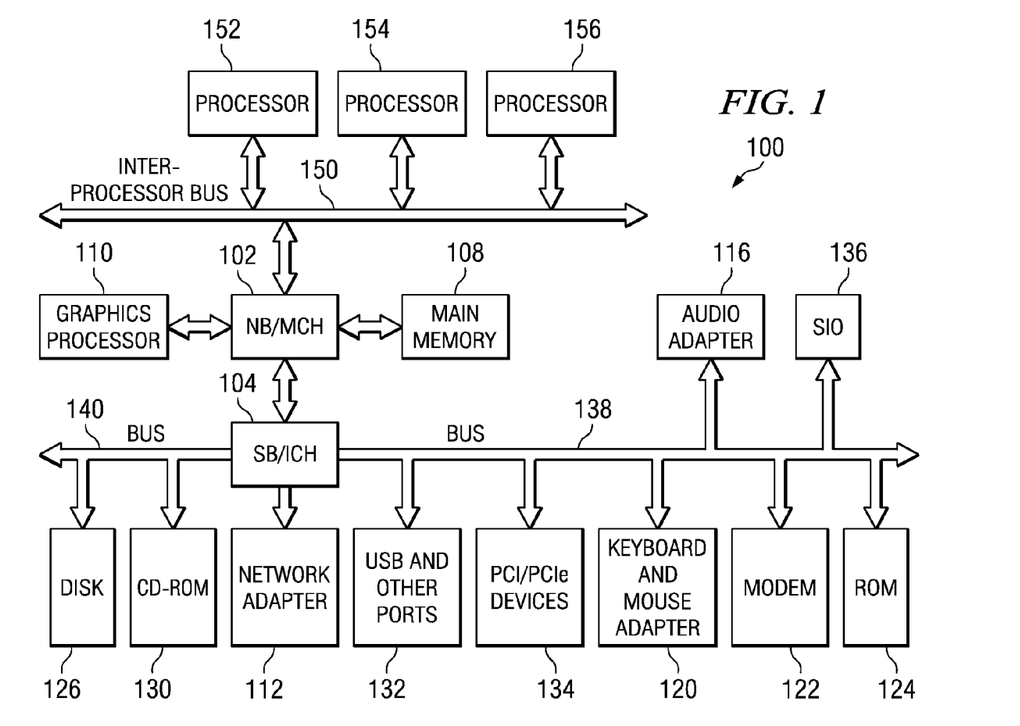
FIG. 1 shows a block diagram of an exemplary data processing system in which aspects of the illustrative embodiments may be implemented.

With reference now to the figures and in particular with reference to FIG. 1, an exemplary diagram of a data processing environment is provided in which illustrative embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environment may be made without departing from the spirit and scope of the present invention.

With reference now to FIG. 1, a block diagram of an exemplary data processing system is shown in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processors 152, 154, and 156 are connected to NB/MCH 102 through inter-processor bus 150. Main memory 108 and graphics processor 110 are connected to NB/MCH 102. Graphics processor 110 may be connected to NB/MCH 102 through an accelerated graphics port (AGP), for example.

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processors 152, 154, and 156. The operating system coordinates and provides control of various components within the data processing system 100 in FIG. 1. The operating system may be a commercially available operating system such as Microsoft® Windows® XP (Microsoft and Windows are trademarks of Microsoft Corporation in the United States, other countries, or both). Data processing system 100 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both).

Instructions for the operating system and applications or programs are located on storage devices, such as HDD 126, and may be loaded into main memory 108 for execution by processors 152, 154, and 156. The processes for illustrative embodiments of the present invention may be performed by processors 152, 154, and 156 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Moreover, the data processing system 100 may take the form of any of a number of different data processing systems including client computing devices, server computing devices, a tablet computer, laptop computer, or the like. Essentially, data processing system 100 may be any known or later developed data processing system without architectural limitation.

In accordance with an illustrative embodiment, processor 152, processor 154, and processor 156 may form a heterogeneous multiprocessing environment. For example, processor 152 may comprise eight processing cores, or processing units (PUs), having a lowest speed or processing capacity. Processor 154 may comprise four processing cores, or PUs, having an intermediate speed or processing capacity. Processor 156 may comprise two PUs having a highest speed or processing capacity.

The configuration of processors and processing units is exemplary and not meant to imply architectural limitation with regard to the environments in which aspects or embodiments of the present invention may be implemented. Many modifications to the depicted environment may be made without departing from the spirit and scope of the present invention. For instance, there may be more or fewer processing units depending upon the implementation or environment. More specifically, there may be thousands of processing units, for example. As another example, data processing system 100 may include several eight-PU processors, several four-PU processors, and several two-PU processors. In addition, within a processor, the processor units may be heterogeneous. A processor may be a system on a chip, such as the Cell Broadband Engine from IBM Corporation. In another implementation, for example, each PU may be a self-contained processor.

In accordance with an illustrative embodiment, a mechanism is provided for scheduling tasks across multiple processor units of differing capacity. In a multiple processor unit system with processor units of disparate speeds, it is advantageous to have the most processing-intensive tasks run on the processor units with the highest capacity. In the illustrative embodiments, all tasks are initially scheduled on the lowest capacity processor units. The operating system on each PU monitors tasks running on the PU. Initially a task may run on the PU for a predetermined period of time referred to as a timeslice. In one exemplary embodiment, the task may run for more than one timeslice to collect accurate processor usage measurements. At the end of each timeslice, each PU records its task processor usage measurements.

Because processor units with higher capacity are more likely to have idle time, these higher capacity processor units may pull one or more tasks onto themselves from the same or lower capacity processor units. A processor unit will attempt to pull tasks that utilize a larger percentage of their timeslice.

When a task runs on a processor, it will either run for its entire timeslice or cede the processor before its timeslice ends. After this, a piece of the operating system called the scheduler runs. It is at this point that processor usage measurements are gathered and saved as part of the task. The scheduler then selects the next task from the runqueue and lets the task run on the processor. A runqueue is a queue of tasks that can be run on that processor.

In the illustrative embodiment, a task is moved between runqueues for different processors. So, when a processor of higher capacity has idle time, it can examine the runqueue for a processor of lower capacity and "pull up" a task that is processor-intensive to the higher capacity processor. This explanation assumes that there is a separate runqueue for each processor; however, this is not always the case. The number of runqueues in an operating system may be operating system specific.

When a task is "pushed down" or "pulled up," the task itself, the task structure used in a given operating system, gets transferred so that it can run on a different processor. Whether this means transferring the task structure to a different runqueue or just marking a bit in the task structure to refer to the processor it is supposed to run on may depend on the implementation or, more particularly, the operating system.

When a higher capacity processor unit is overloaded or near capacity, the higher capacity processor unit may push tasks to processor units with the same or lower capacity. A processor unit will attempt to push tasks that utilize a smaller percentage of their timeslice. This may be extended to more than two levels of hierarchy. In fact, there may be many intermediate processor unit capacity groups. As task processor usage varies, near system equilibrium may be reached as task processor need becomes matched to processor units with corresponding capacity.

Figure 2A:
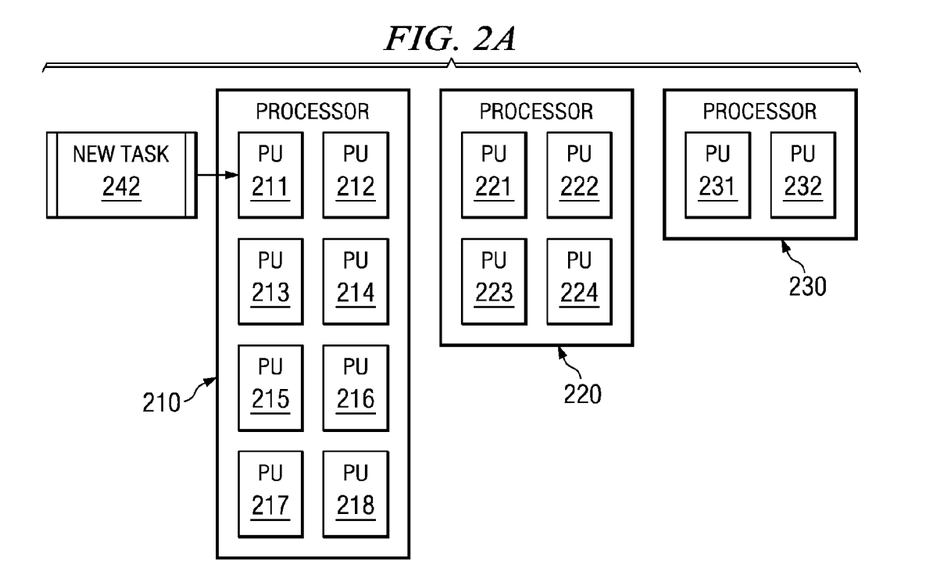
FIG. 2A is a block diagram of a processor unit configuration that illustrates assignment of a new task in accordance with an illustrative embodiment.

FIG. 2A is a block diagram of a processor unit configuration that illustrates assignment of a new task in accordance with an illustrative embodiment. In the depicted example, processor 210 has eight processor units 211-218, processor 220 has four processor units 221-224, and processor 230 has two processor units 231-232. In the depicted example, processor units (PUs) 211-218 form a group of lowest capacity PUs, PUs 221-224 form a group of intermediate capacity PUs, and PUs 231-232 form a group of highest capacity PUs.

When a task, such as new task 242, is initially assigned it is assigned to a PU in the lowest capacity group, in this case a PU in processor 210. A controller task running on one of the PUs assigns tasks. The scheduler piece of the operating system may be the controller task, for example. The operating system on PU 211 monitors execution of task 242 as it runs on PU 211. Initially task 242 may run on PU 211 for a predetermined period of time referred to as a timeslice. In one exemplary embodiment, task 242 may run on PU 211 for more than one timeslice to collect accurate processor usage measurements. At the end of each timeslice, each PU communicates its task processor usage measurements to the other PUs.

Figure 2B:
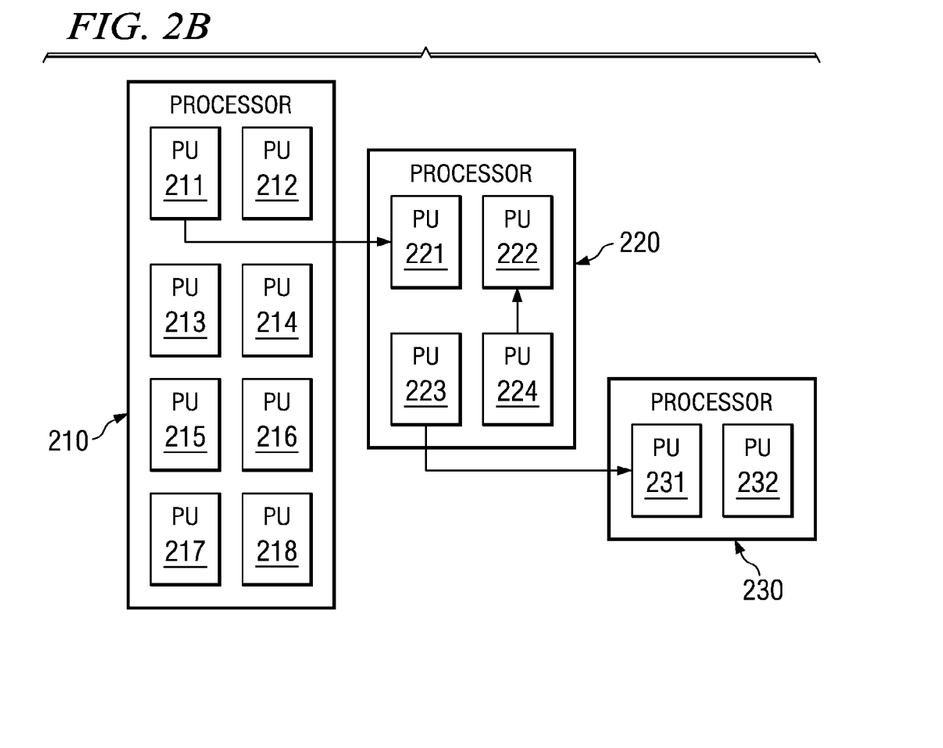
FIG. 2B is a block diagram of a processor unit configuration that illustrates pulling of tasks from lower capacity processor units to higher capacity processor units in accordance with an illustrative embodiment.

Because processor units with higher capacity are more likely to have idle time, these higher capacity processor units may pull one or more tasks onto themselves from the same or lower capacity processor units. A processor unit will attempt to pull tasks that utilize a larger percentage of their timeslice. FIG. 2B is a block diagram of a processor unit configuration that illustrates pulling of tasks from lower capacity processor units to higher capacity processor units in accordance with an illustrative embodiment. In the depicted example, PUs 211, 223, and 224 have "hungry" tasks that utilize a large percentage of their timeslice, while PUs 221, 222, and 231 have unutilized capacity. Tasks that utilize a large percentage of their timeslice are processor-intensive tasks, also referred to as "CPU hogs" or "hungry" tasks. Thus, PU 231, having unutilized capacity, pulls one or more tasks from PU 223. PU 222 pulls one or more tasks from PU 224, which is in the same capacity group. PU 221 pulls one or more tasks from PU 211.

Figure 2C:
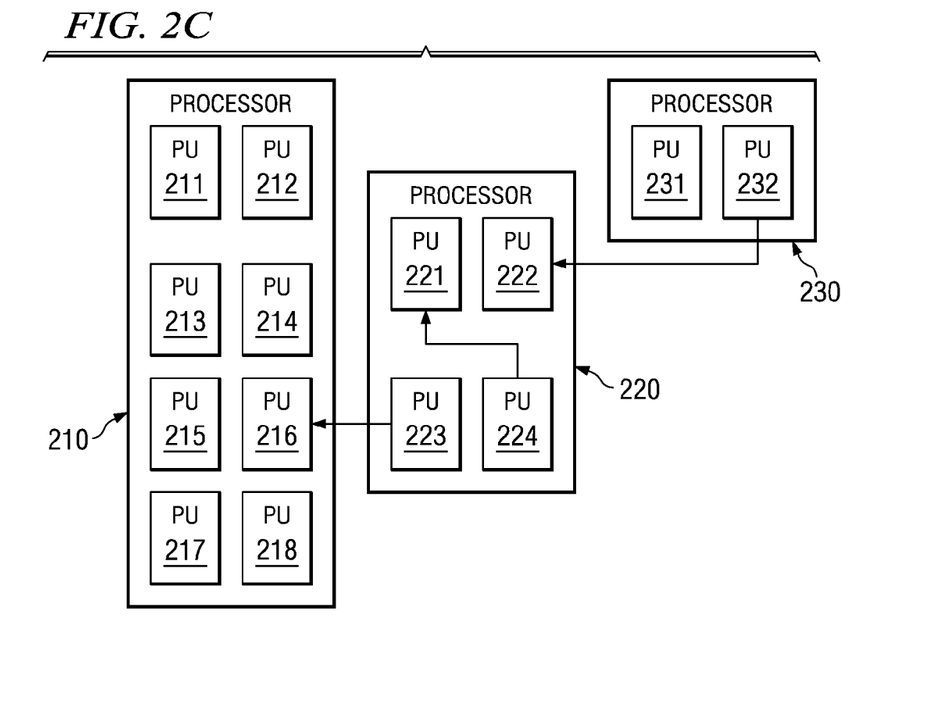
FIG. 2C is a block diagram of a processor unit configuration that illustrates pushing of tasks from higher capacity processor units to lower capacity processor units in accordance with an illustrative embodiment.

When a higher capacity processor unit is overloaded or near capacity, the higher capacity processor unit may push tasks to processor units with the same or lower capacity. A processor unit will attempt to push tasks that utilize a smaller percentage of their timeslice. FIG. 2C is a block diagram of a processor unit configuration that illustrates pushing of tasks from higher capacity processor units to lower capacity processor units in accordance with an illustrative embodiment. In the depicted example, PUs 223, 224, and 232 have "light" tasks that utilize a small percentage of their timeslice, while PUs 216, 221, and 222 have unutilized capacity. Thus, PU 232, having overloaded or near full capacity, pushes one or more tasks to PU 222, which has unutilized capacity. PU 224 pushes one or more tasks to PU 221, which is in the same capacity group. PU 223 pushes one or more tasks to PU 216, which, again, has unutilized capacity.

This may be extended to more than three levels of hierarchy or may include only two levels of hierarchy. In fact, there may be many intermediate processor unit capacity groups. As task processor usage varies, near system equilibrium may be reached as task processor need becomes matched to processor units with corresponding capacity. It should be noted that the mechanism of the illustrative embodiments may attempt to keep related tasks, such as forked tasks, in the same processor group to exploit cache warmth.

Figure 3:
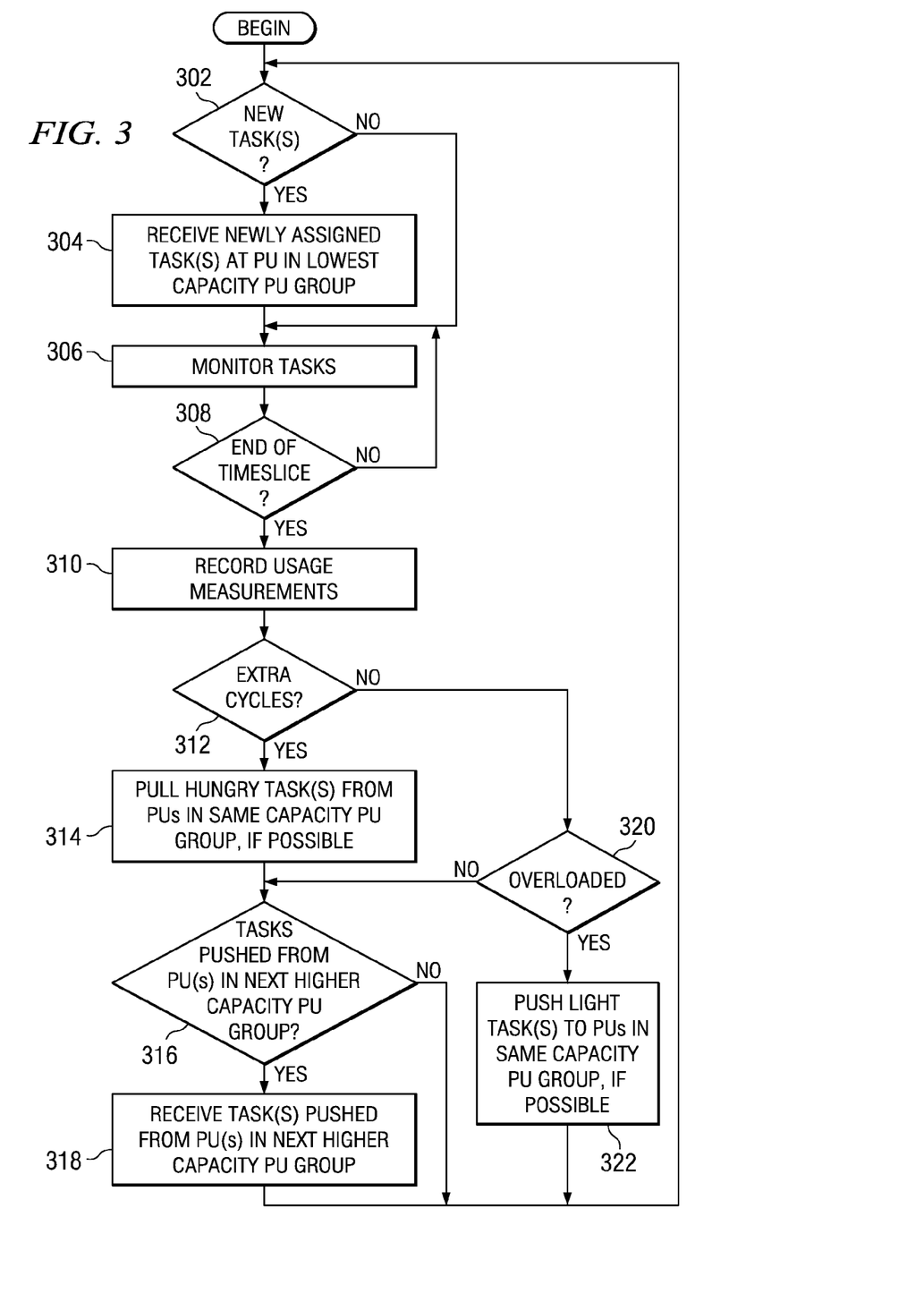
FIG. 3 is a flowchart illustrating operation of a mechanism in a lowest capacity processor unit for scheduling tasks across multiple processor units of differing capacity in accordance with an illustrative embodiment.

FIG. 3 is a flowchart illustrating operation of a mechanism in a lowest capacity processor unit for scheduling tasks across multiple processor units of differing capacity in accordance with an illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

With reference to FIG. 3, operation begins and the mechanism determines whether there is a new task or tasks being assigned (block 302). If there are one or more new tasks, the mechanism receives the newly assigned task(s) at the processing unit (PU) in the lowest capacity PU group (block 304). Thereafter, or if there are no new tasks in block 302, the mechanism monitors the tasks running on the PU (block 306). Then, the mechanism determines whether the end of the current timeslice is reached (block 308). If the end of the current timeslice is not reached, operation returns to block 306 to monitor the tasks running on the PU.

If the end of the current timeslice is reached in block 308, the mechanism records the usage measurements of its tasks (block 310). Next, the mechanism determines whether the PU has extra cycles (block 312). If the PU has extra cycles, then the PU may take on additional tasks. In this instance, the mechanism pulls one or more hungry tasks from PU(s) in the same capacity group, if possible (block 314). Thereafter, the mechanism determines whether any tasks are pushed from PU(s) in the next higher capacity PU group (block 316). If there are no tasks pushed from PU(s) in the next higher capacity PU group, operation returns to block 302 to determine whether any new tasks are assigned to the PU.

If there are one or more tasks pushed to the PU from PU(s) in the next higher PU group in block 316, the mechanism receives the one or more tasks pushed from the PU(s) in the next higher capacity PU group (block 318). Thereafter, operation returns to block 302 to determine whether any new tasks are assigned to the PU.

Returning to block 312, if the PU does not have extra cycles, the mechanism determines whether the PU is overloaded or near capacity (block 320). If the PU is not overloaded, operation proceeds to block 316 to determine whether any tasks are pushed from PU(s) in the next higher capacity PU group. If the PU is overloaded in block 320, the mechanism pushes one or more light tasks to PU(s) in the same capacity PU group, if possible (block 322). Thereafter, operation returns to block 302 to determine whether any new tasks are assigned to the PU.

Figure 4:
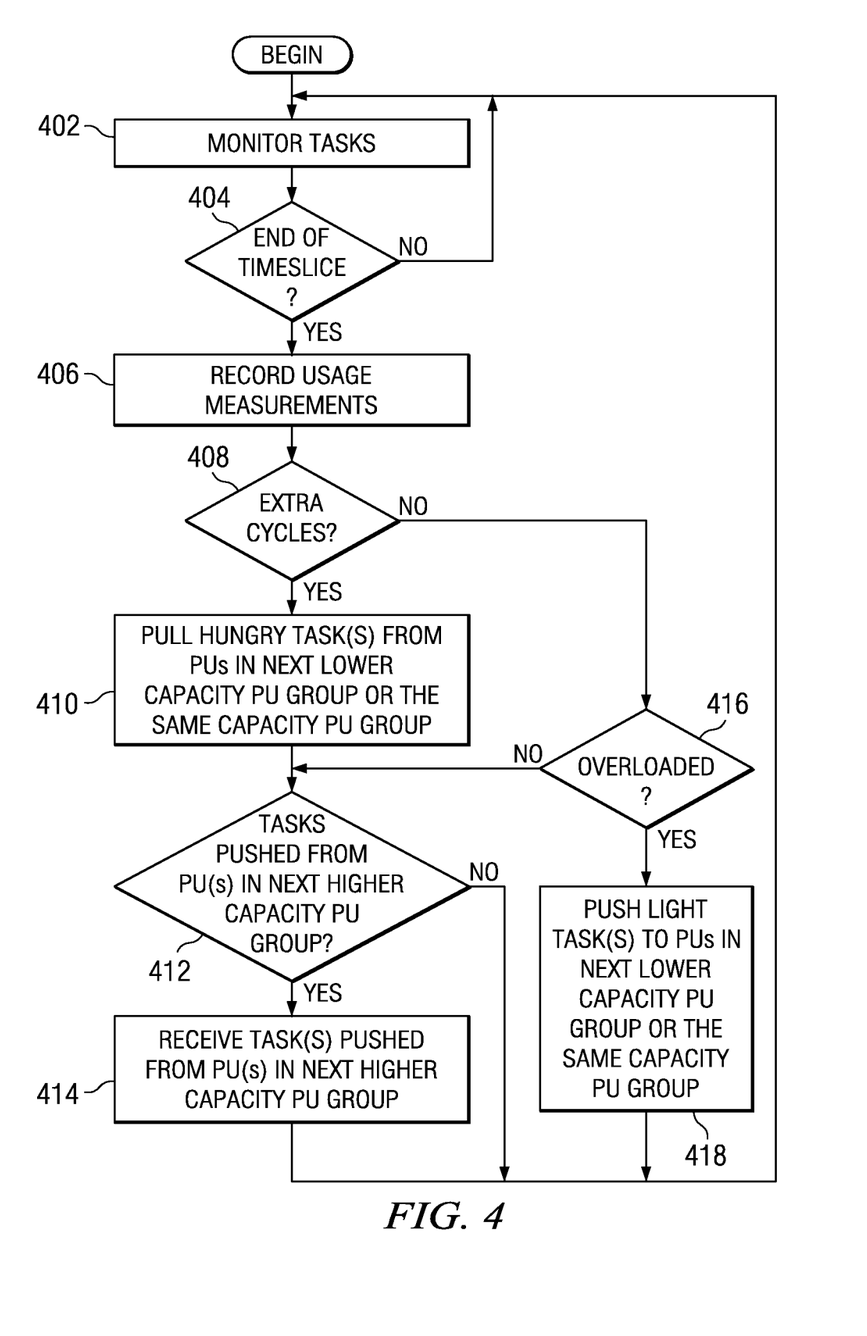
FIG. 4 is a flowchart illustrating operation of a mechanism in an intermediate capacity processor unit for scheduling tasks across multiple processor units of differing capacity in accordance with an illustrative embodiment.

FIG. 4 is a flowchart illustrating operation of a mechanism in an intermediate capacity processor unit for scheduling tasks across multiple processor units of differing capacity in accordance with an illustrative embodiment. Operation begins and the mechanism monitors the tasks running on the PU (block 402). Then, the mechanism determines whether the end of the current timeslice is reached (block 404). If the end of the current timeslice is not reached, operation returns to block 402 to monitor the tasks running on the PU.

If the end of the current timeslice is reached in block 404, the mechanism records the usage measurements of its tasks (block 406). Next, the mechanism determines whether the PU has extra cycles (block 408). If the PU has extra cycles, then the PU may take on additional tasks. In this instance, the mechanism pulls one or more hungry tasks from PU(s) in the next lower capacity PU group or the same capacity group, if possible (block 410). Thereafter, the mechanism determines whether any tasks are pushed from PU(s) in the next higher capacity PU group (block 412). If there are no tasks pushed from PU(s) in the next higher capacity PU group, operation returns to block 402 to monitor tasks running on the PU.

If there are one or more tasks pushed to the PU from PU(s) in the next higher PU group in block 412, the mechanism receives the one or more tasks pushed from the PU(s) in the next higher capacity PU group (block 414). Thereafter, operation returns to block 402 to monitor tasks running on the PU.

Returning to block 408, if the PU does not have extra cycles, the mechanism determines whether the PU is overloaded or near capacity (block 416). If the PU is not overloaded, operation proceeds to block 412 to determine whether any tasks are pushed from PU(s) in the next higher capacity PU group. If the PU is overloaded in block 416, the mechanism pushes one or more light tasks to PU(s) in the next lower capacity PU group or same capacity PU group, if possible (block 418). Thereafter, operation returns to block 402 to monitor tasks running on the PU.

Figure 5:
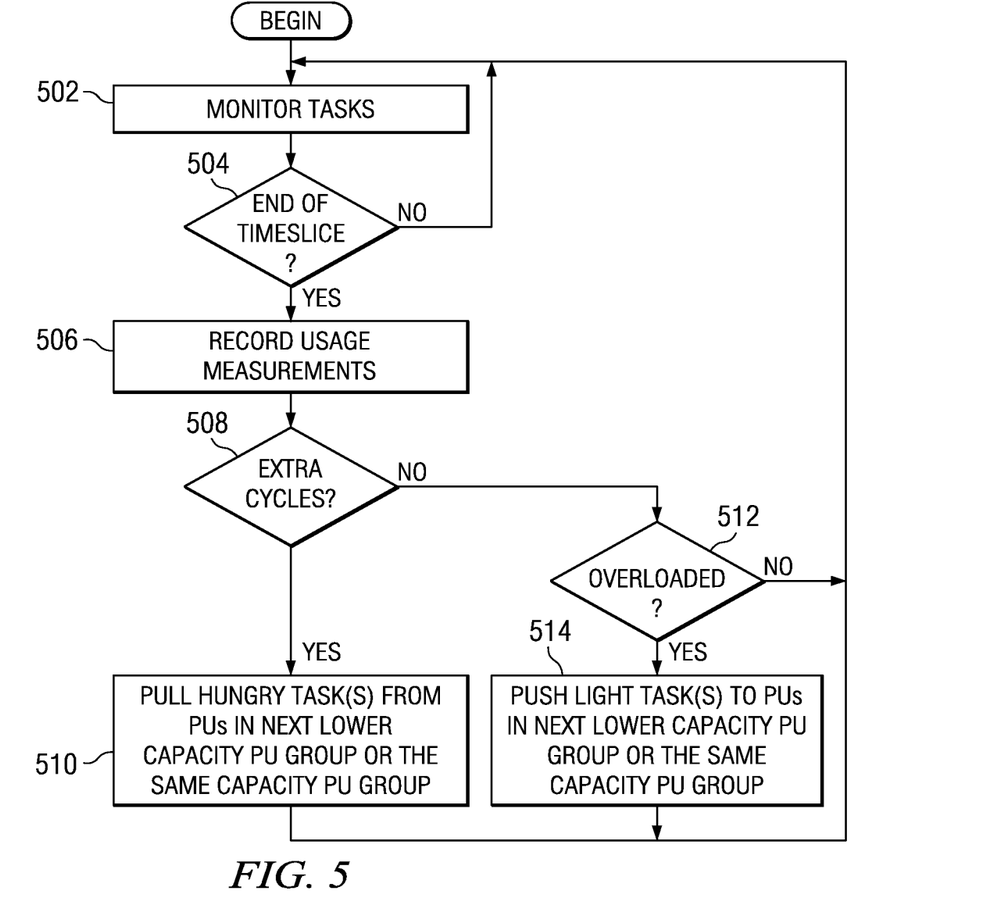
FIG. 5 is a flowchart illustrating operation of a mechanism in a highest capacity processor unit for scheduling tasks across multiple processor units of differing capacity in accordance with an illustrative embodiment.

FIG. 5 is a flowchart illustrating operation of a mechanism in a highest capacity processor unit for scheduling tasks across multiple processor units of differing capacity in accordance with an illustrative embodiment. Operation begins and the mechanism monitors the tasks running on the PU (block 502). Then, the mechanism determines whether the end of the current timeslice is reached (block 504). If the end of the current timeslice is not reached, operation returns to block 502 to monitor the tasks running on the PU.

If the end of the current timeslice is reached in block 504, the mechanism records the usage measurements of its tasks (block 506). Next, the mechanism determines whether the PU has extra cycles (block 508). If the PU has extra cycles, then the PU may take on additional tasks. In this instance, the mechanism pulls one or more hungry tasks from PU(s) in the next lower capacity PU group or the same capacity group, if possible (block 510). Thereafter, operation returns to block 502 to monitor tasks running on the PU.

If the PU does not have extra cycles in block 508, the mechanism determines whether the PU is overloaded or near capacity (block 512). If the PU is not overloaded, operation returns to block 502 to monitor tasks running on the PU. If the PU is overloaded in block 512, the mechanism pushes one or more light tasks to PU(s) in the next lower capacity PU group or same capacity PU group, if possible (block 514). Thereafter, operation returns to block 502 to monitor tasks running on the PU.

Thus, the illustrative embodiments solve the disadvantages of the prior art by providing a mechanism for scheduling tasks across multiple processor units of differing capacity. In a multiple processor unit system with processor units of disparate speeds, it is advantageous to have the most processing-intensive tasks run on the processor units with the highest capacity. In the illustrative embodiments, all tasks are initially scheduled on the lowest capacity processor units. Because processor units with higher capacity are more likely to have idle time, these higher capacity processor units may pull one or more tasks onto themselves from the same or lower capacity processor units. A processor unit will attempt to pull tasks that utilize a larger percentage of their timeslice. When a higher capacity processor unit is overloaded or near capacity, the higher capacity processor unit may push tasks to processor units with the same or lower capacity. A processor unit will attempt to push tasks that utilize a smaller percentage of their timeslice. This may be extended to more than two levels of hierarchy. As task processor usage varies, near system equilibrium may be reached as task processor need becomes matched to processor units with corresponding capacity.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for scheduling tasks across multiple processor units of differing capacity in a heterogeneous multiprocessing environment, the method comprising:
   initially assigning a task to a first processor unit within the heterogeneous multiprocessing environment;
   monitoring tasks running on processor units within the heterogeneous multiprocessing environment for a predetermined period of time to record usage measurements, wherein the heterogeneous multiprocessing environment comprises a first group of processor units having a first processing capacity, a second group of processor units having a second processing capacity, and a third group of processor units having a third processing capacity, wherein the second processing capacity is greater than the first processing capacity, wherein the third processing capacity is greater than the second processing capacity, and wherein the first group of processor units includes the first processor unit;

based on the usage measurements, determining whether a second processor unit within the second group of processor units has extra cycles;

selecting a heavy task assigned to the first processor unit based on usage measurements recorded at the first processor unit and pulling the heavy task by the second processor unit responsive to determining the second processor unit has extra cycles; and selecting a light task assigned to a third processor unit based on usage measurements recorded at the third processor unit and pushing the light task by the third processor unit to a target processor unit responsive to determining the third processor unit is overloaded.

2. The method of claim 1, wherein the period of time comprises a time slice.

3. The method of claim 1, wherein selecting the heavy task comprises identifying a task that uses a large percentage of capacity of the first processor unit relative to other tasks assigned to processor units within the first group of processor unit.

4. The method of claim 1, wherein the third group of processor units comprises the third processor unit and wherein selecting the light task comprises identifying a task that uses a small percentage of capacity of the third processor relative to other tasks running on processor units within the third group of processor units.

5. The method of claim 1, wherein the third processor unit has a same processing capacity as the first processor unit.

6. The method of claim 1, wherein the third processor unit has a greater processing capacity than the first processor unit.

7. The method of claim 1, further comprising:
selecting a second heavy task assigned to a given processor unit within the second group of processor units based on usage measurements recorded at the given processor unit and pulling the second heavy task by a target processor unit within the third group of processor units responsive to determining the target processor unit has extra cycles.

8. The method of claim 1, further comprising:
selecting a second light task assigned to a given processor unit within the second group of processor units based on usage measurements recorded at the given processor unit and pushing the second light task to a target processor unit within the first group of processor units responsive to determining the target processor unit has extra cycles.

9. The method of claim 1, wherein pulling the heavy task comprises transferring a task structure of the heavy task from a run queue of the first processor unit to a run queue of the second processor unit.

10. The method of claim 1, wherein pulling the heavy task comprises marking a bit in a task structure of the task to refer to the second processor unit.

11. A computer program product comprising a non-transitory computer useable medium having a computer readable program, wherein the computer readable program, when executed on a computing device, causes the computing device to:

initially assign a task to a first processor unit within the heterogeneous multiprocessing environment;

monitor tasks running on processor units within the heterogeneous multiprocessing environment for a predetermined period of time to record usage measurements, wherein the heterogeneous multiprocessing environment comprises a first group of processor units having a first processing capacity, a second group of processor units having a second processing capacity, and a third group of processor units having a third processing capacity, wherein the second processing capacity is greater than the first processing capacity, wherein the third processing capacity is greater than the second processing capacity, and wherein the first group of processor units includes the first processor unit;

based on the usage measurements, determine whether a second processor unit within the second group of processor units has extra cycles;

select a heavy task assigned to the first processor unit based on usage measurements recorded at the first processor unit and pull the heavy task by the second processor unit responsive to determining the second processor unit has extra cycles; and select a light task assigned to a third processor unit based on usage measurements recorded at the third processor unit and push the light task by the third processor unit to a target processor unit responsive to determining the third processor unit is overloaded.

12. The computer program product of claim 11, wherein the period of time comprises a time slice of the first processor unit.

13. The computer program product of claim 11, wherein selecting the heavy task comprises identifying a task that uses a large percentage of capacity of the first processor unit relative to other tasks assigned to processor units within the first group of processor units.

14. The computer program product of claim 11, wherein the third group of processor units comprises the third processor unit and wherein selecting the light task comprises identifying a task that uses a small percentage of capacity of the third processor relative to other tasks running on processor units within the third group of processor units.

15. The computer program product of claim 11, wherein the third processor unit has a same processing capacity as the first processor unit.

16. The computer program product of claim 11, wherein the third processor unit has a lower processing capacity than the first processor unit.

17. The computer program product of claim 11, wherein the computer readable program further causes the computing device to:
select a second light task assigned to a given processor unit within the second group of processor units based on usage measurements recorded at the given processor unit and pull the second light task by a target processor unit within the first group of processor units responsive to determining the target processor unit has extra cycles.

18. A data processing system, comprising:
a plurality of processor units, wherein the plurality of processor units comprises a first group of processor units having a first processing capacity, a second group of processor units having a second processing capacity, and a third group of processor units having a third processing capacity, wherein the second processing capacity is greater than the first processing capacity, and wherein the third processing capacity is greater than the second processing capacity; and a memory coupled to a first processor unit within the first group of processor units, wherein the memory contains instructions which, when executed by the first processor unit, cause the first processor unit to:

initially assign a task to a first processor unit within the first group of processor units;

monitor tasks running on processor units for a predetermined period of time to record usage measurements;

based on the usage measurements, determine whether a second processor unit within the second group of processor units has extra cycles;

select a heavy task from the first processor unit based on usage measurements recorded at the first processor unit and pull the heavy task by the second processor unit responsive to determining the second processor unit has extra cycles; and select a light task assigned to a third processor unit based on usage measurements recorded at the third processor unit and push the light task by the third processor unit to a target processor unit responsive to determining the third processor unit is overloaded.

19. The data processing system of claim 18, wherein the period of time comprises a time slice.

20. The data processing system of claim 18, wherein selecting the heavy task from the first processor unit comprises identifying a task that uses a large percentage of capacity of the first processor unit relative to other tasks assigned to processor units within the first group of processor units.

21. The data processing system of claim 18, wherein the third group of processor units comprises the third processor unit and wherein selecting the light task comprises identifying a task that uses a small percentage of capacity of the third processor relative to other tasks running on processor units within the third group of processor units.

22. The data processing system of claim 18, wherein the third processor unit is within the first group of processor units.

23. The data processing system of claim 18, wherein the third processor unit is within the second group of processor units.

24. The data processing system of claim 18, wherein the instructions further cause the first processor to:

select a second light task assigned to a given processor unit within the second group of processor units based on usage measurements recorded at the given processor unit and push the second light task to a target processor unit within the first group of processor units responsive to determining the target processor unit has extra cycles.

* * * * *